UNITED STATES PATENT OFFICE.

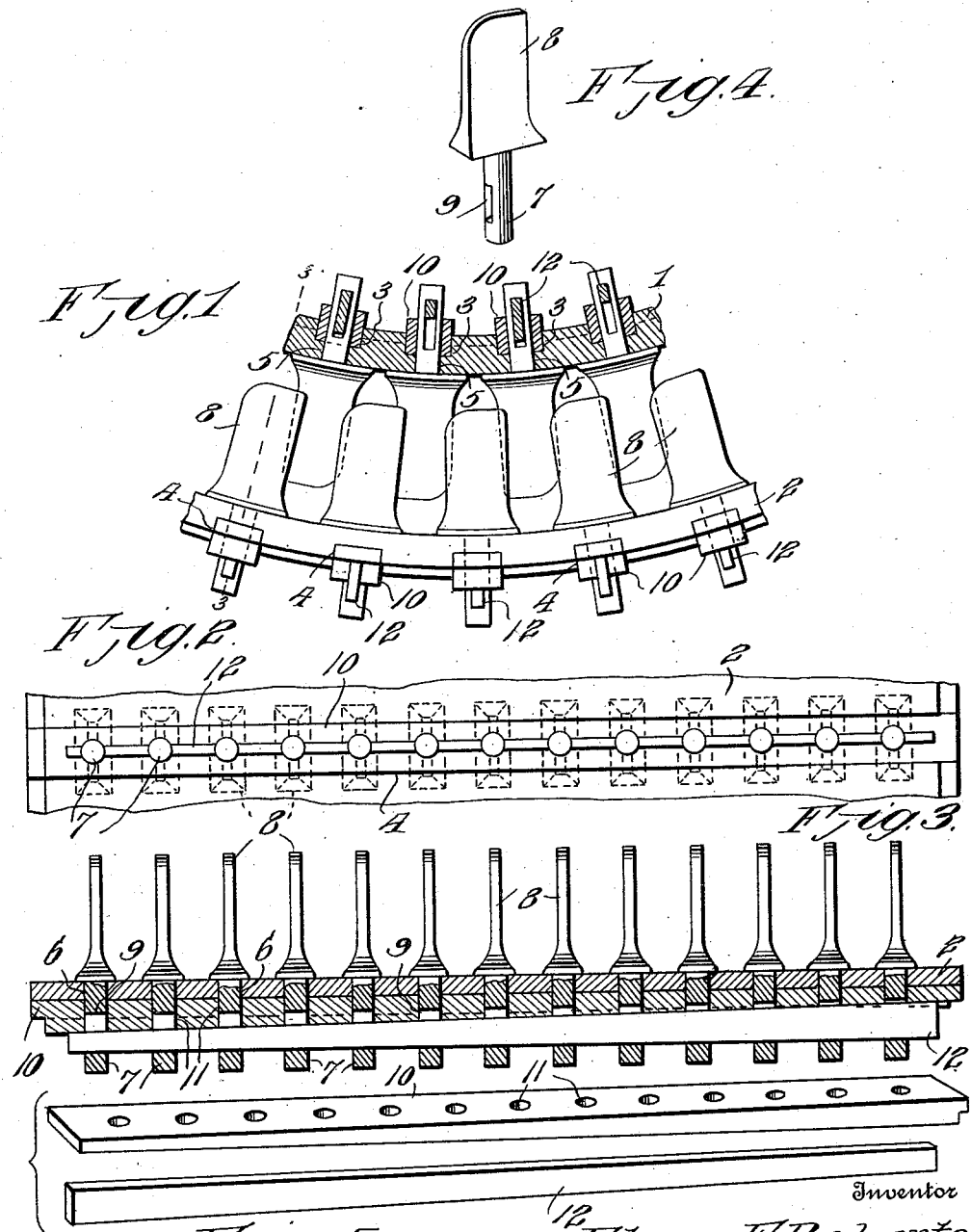

ELMER E. ROBERTS, OF BALKO, OKLAHOMA.

TOOTH-FASTENER FOR THRESHING-MACHINE CONCAVES AND CYLINDERS.

1,015,743.  Specification of Letters Patent.  Patented Jan. 23, 1912.

Application filed June 21, 1911. Serial No. 634,404.

*To all whom it may concern:*

Be it known that I, ELMER E. ROBERTS, a citizen of the United States of America, residing at Balko, in the county of Beaver and State of Oklahoma, have invented new and useful Improvements in Tooth-Fasteners for Threshing-Machine Concaves and Cylinders, of which the following is a specification.

This invention relates to the concaves and cylinders for threshing machines, and it has for its object to provide a novel and efficient method of mounting the teeth in such concaves and cylinders.

A particular object of the invention is to provide a fastening means whereby a plurality of teeth may be simultaneously secured and tightened in position for use.

A further object of the invention is to provide a fastening device comprising two coacting wedge-shaped members each adapted for simultaneous engagement with a plurality of teeth which by means of said fastening members may be simultaneously secured and tightened in position for use.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a sectional view showing the invention as applied to a cylinder and to a concave, a portion of each being shown. Fig. 2 is a bottom plan view of a portion of the concave showing a row of teeth and the means for securing the same. Fig. 3 is a sectional view taken through the concave on the line 3—3 in Fig. 1. Fig. 4 is a perspective view showing one of the teeth detached. Fig. 5 is a perspective view showing the wedge members constituting the improved fastening device detached.

Corresponding parts in the several figures are denoted by like characters of reference.

The inner face of the cylinder 1 and the bottom face of the concave 2 are provided with transverse grooves designated, respectively, 3 and 4, the bottom of each groove having a row of apertures 5, 6 extending through the body of the cylinder and the concave, respectively, for the passage of the shanks 7 of the teeth 8. The apertures 5 and 6 are preferably circular, enabling them to be easily and accurately bored and finished, and also enabling the shanks 7 to be accurately fitted thereto. The shanks 7 are provided with transverse slots 9.

Each of the grooves 3 and 4 is adapted to receive a washer member 10 consisting of a tapering or wedge-shaped strip having a plurality of apertures 11 for the passage of the shanks of the teeth extending therethrough. The slots 9 in the shanks 7 of the teeth must be of a length to project sufficiently beyond the inclined face of the washer member 10 to admit of the passage of a wedge-shaped key 12. The key 12 and the washer member 10 are so constructed and proportioned that when the inclined meeting faces of said key and washer member are in contact, the outer faces of said members will be in parallel relation. Thus, assuming the parts to be properly proportioned, after inserting the teeth and properly positioning the washer member, the key may be projected through the slots of each of the tooth shanks to a certain extent, after which, by tapping the large end of the key member with the hammer, or other suitable tool, the said key member may be tightly driven home, at the same time exerting a tightening action against the shank of each tooth engaged thereby.

As will be readily seen from the foregoing description, the invention is equally applicable to the cylinders and to the concaves of threshing machines for the purpose of securing and tightening the teeth, an entire row of teeth being tightened by the action of a single wedge-shaped key. Conversely, by removing the key the entire row of teeth will be loosened and capable of being readily detached.

This invention, as will be seen, is extremely simple and will be found thoroughly efficient for the purposes for which it is provided.

Having thus described the invention, what is claimed as new, is:—

A body member having a groove of equal depth throughout and perforations extending from the bottom of said groove, teeth having shanks extending through the apertures, said shanks being provided with slots of equal length, a wedge-shaped washer member placed in the bottom of the groove and having apertures engaging the shanks of the teeth, the slots of which project beyond the inclined face of said washer member, and a wedge-shaped key engaging the slots of the tooth shanks and having an inclined face corresponding with the meeting face of the washer member.

In testimony whereof I affix my signature in presence of two witnesses.

ELMER E. ROBERTS.

Witnesses:
   ONA B. ROBERTS,
   BLANCHE C. HILL.

Copies of this patent may be obtained for five cents each, by addressing the "Commissioner of Patents, Washington, D. C."